United States Patent [19]

Vereschagin et al.

[11] 4,089,933

[45] May 16, 1978

[54] METHOD OF PRODUCING POLYCRYSTALLINE DIAMOND AGGREGATES

[75] Inventors: Leonid Fedorovich Vereschagin; Evgeny Nikolaevich Yakovlev, both of Moscow; Tatyana Dmitrievna Varfolomeeva, Moskoyskaya oblast; Alexandr Yakovlevich Preobrazhensky, Moscow; Vladislav Nikolaevich Slesarev, Moscow; Vasily Alexandrovich Stepanov, Moscow; Ljudmila Efimovna Shterenberg, Moscow, all of U.S.S.R.

[73] Assignee: Institut Fiziki Vysokikh Daleny Akademi Nauk, SSSR, Moskovskaya oblast, U.S.S.R.

[21] Appl. No.: 726,819

[22] Filed: Sep. 27, 1976

Related U.S. Application Data

[63] Continuation of Ser. No. 645,097, Dec. 29, 1975, abandoned, which is a continuation of Ser. No. 563,467, Mar. 31, 1975, abandoned, which is a continuation of Ser. No. 103,128, Dec. 31, 1970, abandoned.

[30] Foreign Application Priority Data

Jan. 4, 1970 U.S.S.R. .............................. 1513779

[51] Int. Cl.$^2$ ..................... C01B 31/06; B01J 3/06
[52] U.S. Cl. ........................................ 423/446; 51/307
[58] Field of Search ........................... 423/446; 51/307

[56] References Cited

U.S. PATENT DOCUMENTS

| | | | |
|---|---|---|---|
| 2,947,608 | 8/1960 | Hall | 423/446 |
| 2,947,609 | 8/1960 | Strong | 423/446 |
| 2,947,610 | 8/1960 | Hall et al. | 423/446 |
| 3,310,501 | 3/1967 | Darrow et al. | 423/446 X |
| 3,334,968 | 8/1967 | Ishizuka | 423/446 |
| 3,399,254 | 8/1968 | Dunnington | 423/446 X |
| 3,574,580 | 4/1971 | Stromberg et al. | 423/446 X |

*Primary Examiner*—Edward J. Meros
*Attorney, Agent, or Firm*—Holman & Stern

[57] ABSTRACT

A method of producing polycrystalline diamond aggregates, wherein a carbon-containing material is given a required shape, after which, in the presence of a catalyst taken in the form of a powder whose envelope surrounds the carbon-containing material, said material is subjected to the action of pressure and simultaneous heating by an electric current pulse with a duration of 0.1 to 10.0 sec.

1 Claim, 1 Drawing Figure

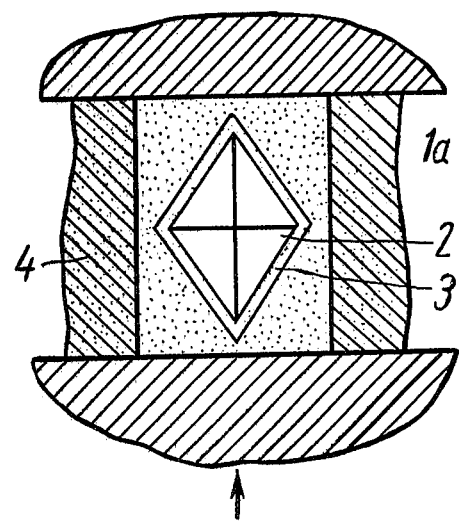

METHOD OF PRODUCING POLYCRYSTALLINE DIAMOND AGGREGATES

This is a continuation of application Ser. No. 645,097 filed Dec. 29, 1975 which in turn is a continuation of Ser. No. 563,467 filed Mar. 31, 1975, which in turn is a continuation of Ser. No. 103,128 filed Dec. 31, 1970, all of which are all now abandoned.

The present invention relates to methods of producing super hard materials, and has particular reference to methods of producing polycrystalline diamond aggregates.

The present invention may be used most effectively for producing polycrystalline diamond aggregates with a high purity of surface.

The known method of producing polycrystalline diamond aggregates consists in that a carbon-containing material is given a required shape, after which in the presence of a catalyst it is subjected to the action of pressure of at least 80 kbar and is simultaneously heated up to a temperature of at least about 1500° C over a period of time sufficient for the formation of diamond aggregates.

In said known method the catalyst is used in the form of metal discs alternating with layers of the carbon-containing material, which in this case is spectroscopically pure graphite.

The use of the catalyst in the form of metal discs may cause the origination of considerable intercrystallite inclusions of the metal-catalyst in the polycrystalline diamond formation. The presence of such large foreign inclusions in polycrystalline diamond impairs its strength characteristics. Inclusions of metal-catalyst may, therefore, be centres of mechanical strains in polycrystalline diamond, cause its destruction and make such diamond formations unfit for preparing working elements of various cutting tools therefrom.

It should also be pointed out, that use of the catalyst in the form of discs may lead to a relatively low local degree of oversaturation of the catalyst-solvent with the carbon of a carbonaceous substance. The consequence of the latter circumstance may be the growth of relatively large (0.1 to 1.0 mm) and rather poorly interconnected diamond crystallites. A polycrystalline formation that incorporates crystallites of such kind will feature lower strength characteristics as compared with structurally homogeneous polycrystals. Consequently, working elements of cutting tools made from such polycrystals will not feature sufficient strength.

In the known method the process of heating the composition consisting of a carbonaceous material and a metal-catalyst comprises two stages and takes 30-60 minutes. A low rate of increase in the temperature of the composition consisting of a carbonaceous substance and a metal-catalyst, which has been pre-pressurized to at least about 80 kbar, in the diamond stability region, favours the growth of separate diamond grains. Therefore under such conditions the forming polycrystalline diamonds can include crystallites of 0.1 to 1.0 mm in size. The presence of such large crystallites in the mass of smaller ones, being a structural inhomogeneity, per se lowers the strength of the entire polycrystalline formation.

Moreover, such crystallites are far from always featuring groupings and intergrowth with adjacent crystallites, but are associated therewith by relatively weak interlayers of the metal-catalyst. And finally, still another disadvantage of the presence of large crystallites in the polycrystalline formation lies in the fact that such formations are quite liable to shearing under mechanical loads which present no danger for finegrained polycrystalline diamond.

For this reason the use of polycrystalline diamond formations containing large-crystalline inclusions for making therefrom working elements for cutting tools will result in their low mechanical strength and short service life. One of the consequences of the presence of large crystalline inclusions in the polycrystalline formation is a poor quality of the surface of such a polycrystal. Providing a certain shape to the carbon-containing material, with the said method, cannot ensure the attainment, with the same accuracy, of the same shape in the diamond polycrystal, so that a considerable subsequent treatment thereof is required.

It is an object of the present invention to eliminate the above-mentioned disadvantages.

It is a specific object of the invention to provide a method of producing polycrystalline diamond aggregates from a carbon-containing material, said method featuring such an arrangement and state of the catalyst and such heating conditions as to ensure the producing of polycrystalline diamond aggregates of a required shape, noted for their fine-grained structure, small amount of non-diamond inclusions, high mechanical strength and abrasive resistance.

In accordance with said and other objects, in the hereinproposed method, according to the invention, the catalyst is taken in the form of a powder, a carbon-containing material is enveloped thereby, after having been given a required shape, and heated by electric pulses of 0.1 to 10.0 sec duration.

In case the rate of formation of the polycrystalline diamond aggregate is to be decelerated, it is expedient that the powdered catalyst should contain a low-melting filler.

The present invention will become more fully apparent from a consideration of the following detailed description of its exemplary embodiments to be read in conjunction with the accompanying drawing in which a high pressure and temperature cell is diagrammatically represented.

The herein-proposed method of producing polycrystalline diamond aggregates provides that a carbon-containing material is given a required shape, then, according to the invention, it is surrounded by an envelope from a powdered catalyst and subjected to the action of pressure of at least about 80 kbar and simultaneously heated to a temperature of at least about 1500° C by using, according to the invention, an electric pulse of 0.1 to 10.0 sec duration.

As is known from crystal physics, the formation of fine-grained structures is promoted by rapid crystallization under the conditions of strong oversaturation of the mother medium.

In the present method for producing fine-grained aggregates a high rate of transformation of a carbon-containing material into diamond is attained due to the fact that the following two conditions are satisfied simultaneously: (1) a rapid transfer of the carbon-containing material + catalyst system into the region of thermodynamic stability of diamond and high instability of graphite by impulse heating and (2) high development of the surface of the interaction between the catalyst and carbon-containing material.

At the moment of appearance of a current pulse the carbon-containing material surrounded by the powdered catalyst and pre-pressured to at least about 80 kbar is heated in such a way that over the entire contact surface of the catalyst with the carbon-containing material a temperature is created simultaneously which is sufficient for the conversion of the carbon-containing material into diamond. The same conditions over the entire surface of contact of the carbon-containing material with the catalyst result in the formation of a great number of diamond crystallization centers, and high nonequilibrium of the carbon-containing substance + catalyst system brings about a high rate of formation of crystallizatiion centres.

The great number of the crystallization centres leads to the formation of a fine-grained structure, and similarity of the crystallization conditions on these centres ultimately results in the formation of homogeneous polycrystalline diamond aggregates.

An increase in the surface of contact between the catalyst and the carbon-containing material is attained both due to the use of a powdered catalyst and to the peripheral arrangement of the catalyst. The disperse structure of the catalyst ensures localization of the effect of separate catalyst grains on the carbon-containing material and thus stimulates the formation of the fine-grained structure in the polycrystalline diamond aggregate. The employment of the powdered catalyst ensures easy adjustment of its quantity and rearrangment of the catalyst with respect to the carbon-containing material depending on its dimensions, shape and presence of openings therein. Moreover, powdered catalyst ensures sufficiently uniform transmission of pressure to the carbon-containing material, so that the shape of the latter can be preserved when pressurized. An exact replication of the shape of carbon-containing material by the diamond polycrystalline aggregate is attained, evidently, due to the preservation of similitude in the values of linear velocities of conversion in different directions in the process of formation of the diamond aggregate.

The arrangement of the catalyst in the form of a powder over the periphery of the carbon-containing material results in the growth of diamond phase in a direction from the surface towards the centre of the carbon-containing material which is thus transformed into a strong diamond aggregate. Fragments of the catalyst are present in the aggregate in the form of interlayers of micron thickness.

In case the catalyst activity and the rate of formation of the diamond aggregate are to be varied, an inactive component in the form of an inert high-melting filler may be incorporated into the catalyst.

In accordance with the present method diamond polycrystalline aggregates have been synthesized, having a predetermined shape, such as a cone, octahedron, cylinder, needle, and the like, their weight being from 30 to 150 mg. The mechanical strength and abrasive resistance of such synthesized aggregates have been tested under laboratory and industrial conditions.

The results of such tests are commensurate with the results of similar tests with natural diamonds and in some cases even excel them.

Given hereinbelow are examples illustrating the embodiment of the present invention.

As a carbon-containing material use has been made of commercial fine-crystalline spectroscopically pure (reaction) graphite. As a catalyst use has been made of metals which belong to Group VIII of the Periodic Table, their alloys, and also carbide-containing systems.

EXAMPLE 1

Into a high-pressure chamber wherein a pressure of at least about 80 kbar can be created, there is placed a high-temperature reaction cell. The cell comprises an electric resistance heater 1 and 1a made of graphite, reaction graphite 2 which has a shape of the ready article to be produced and a catalyst 3 in the form of a powder, by which the reaction graphite is surrounded as by an envelope. Designated at 4 is a medium which transmits pressure, namely, litho stone. The reaction graphite shaped as an octahedron with edges of 4 mm is surrounded by the powder of a catalyst composed of 79 wt.% of tungsten carbide, 15 wt.% of titanium carbide and 6 wt.% of cobalt and placed in the centre of the heater, the latter, in turn, being arranged in the centre of the unit made of the pressure-transmitting medium, the entire arrangement being then placed into the high-pressure chamber. After the pressure within the chamber has reached about 100 kbar, the chamber dies also functioning as current leads, a pulse of electric current of about 1 sec duration is passed through the reaction cell, which pulse heats the graphite octahedron and the catalyst powder that surrounds said octahedron up to a temperature of about 2000° C. As a result, a polycrystalline diamond aggregate is formed which has the shape of an octahedron. After the current pulse ceases, the pressure is also relieved.

EXAMPLE 2

For producing polycrystalline diamond aggregates of a required shape with an increased degree of surface purity (not below the 5-th class of purity), reaction graphite has been used with a volume density of 2.00 to 2.20 g/cm³ and surface purity not lower than the 7-th class of purity. The process was carried out as described in Example 1.

The resulting polycrystalline diamond aggregate of the required shape is extracted by simple mechanical removal of all the other parts of the reaction cell. When polycrystalline diamond aggregates with an increased surface purity are thus liberated, in case of necessity, the surface cleaning is to be performed by chemical treatment in acids and alkalies.

What is claimed is:

1. In a method of producing polycrystalline diamond aggregates, wherein a carbon-containing material is given a required shape and in the presence of a catalyst subjected to a pressure of at least about 80 kbar and heated simultaneously to a temperature of at least about 1,500° C for a period of time sufficient for the formation of diamond aggregates, the improvement which comprises imparting to said carbon-containing material the shape of the required polycrystalline aggregate and providing said catalyst as an envelope in the form of powder surrounding said carbon-containing material, said catalyst transmitting pressure uniformly to said carbon-containing material in the course of compression, and said heating being effected by an electric pulse having a duration of from 0.1 to 10 seconds.

* * * * *